United States Patent [19]
Hoyaukin

[11] Patent Number: 5,746,442
[45] Date of Patent: May 5, 1998

[54] SAFETY APPAREL

[76] Inventor: Peter Hoyaukin, Stagneliusvägen 42 II, S-112 57, Stockholm, Sweden

[21] Appl. No.: 750,327
[22] PCT Filed: Jun. 2, 1995
[86] PCT No.: PCT/SE95/00645
 § 371 Date: Dec. 5, 1996
 § 102(e) Date: Dec. 5, 1996
[87] PCT Pub. No.: WO95/33389
 PCT Pub. Date: Dec. 14, 1995

[30] Foreign Application Priority Data

Jun. 6, 1994 [SE] Sweden .................... 9401944

[51] Int. Cl.⁶ .................................. B60R 21/00
[52] U.S. Cl. ............... 280/730.1; 280/733; 280/737; 2/456
[58] Field of Search ............ 280/730.1, 728.1, 280/737, 733; 2/456, DIG. 3

[56] References Cited

U.S. PATENT DOCUMENTS

| | | | |
|---|---|---|---|
| 3,930,666 | 1/1976 | Lynch et al. | 280/736 |
| 3,930,667 | 1/1976 | Osachowski | 280/730.1 |
| 4,059,852 | 11/1977 | Crane | 2/456 |
| 4,685,151 | 8/1987 | Kincheloe | 2/DIG. 3 X |
| 4,984,821 | 1/1991 | Kim et al. | 280/728.1 |
| 5,273,312 | 12/1993 | Coultas et al. | 280/737 |
| 5,362,098 | 11/1994 | Guill | 280/733 |
| 5,535,446 | 7/1996 | Pusic | 280/733 X |

Primary Examiner—Christopher P. Ellis
Attorney, Agent, or Firm—Sughrue, Mion, Zinn, Macpeak & Seas, PLLC

[57] ABSTRACT

Safety apparel, particularly, but not exclusively, for motorcyclists, equestrians and other unprotected persons comprises inflatable, shock-absorbing pads. Inflation of the pads is effected with the aid of a gas-delivering arrangement (5) which includes a container (19) which is sealed by means of a sealing plate (20) and which contains compressed or liquefied gas, a small explosive charge (22), means (6, 30) for detonating the explosive charge in the event of an accident, and further comprises a device (21) which is activated by the explosive charge so as to penetrate the sealing plate (22). the explosive charge (22) is intended to be detonated by means of a striking pin (23) operated by a spring (37). Means (6, 30) are arranged for storing the energy required herefor in the spring as a result of a relative motion between the wearer (2) of the protective apparel (4) and a motorcycle, a horse or the like caused by an accident.

16 Claims, 4 Drawing Sheets

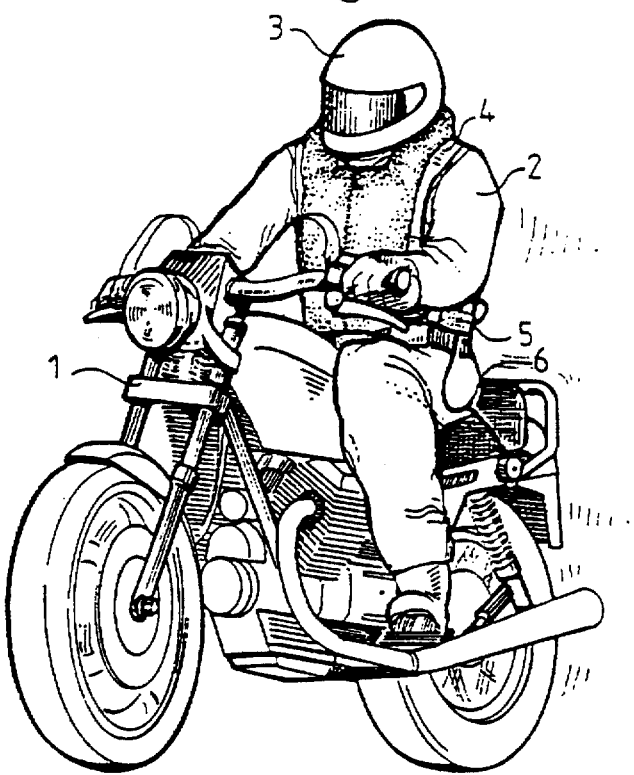
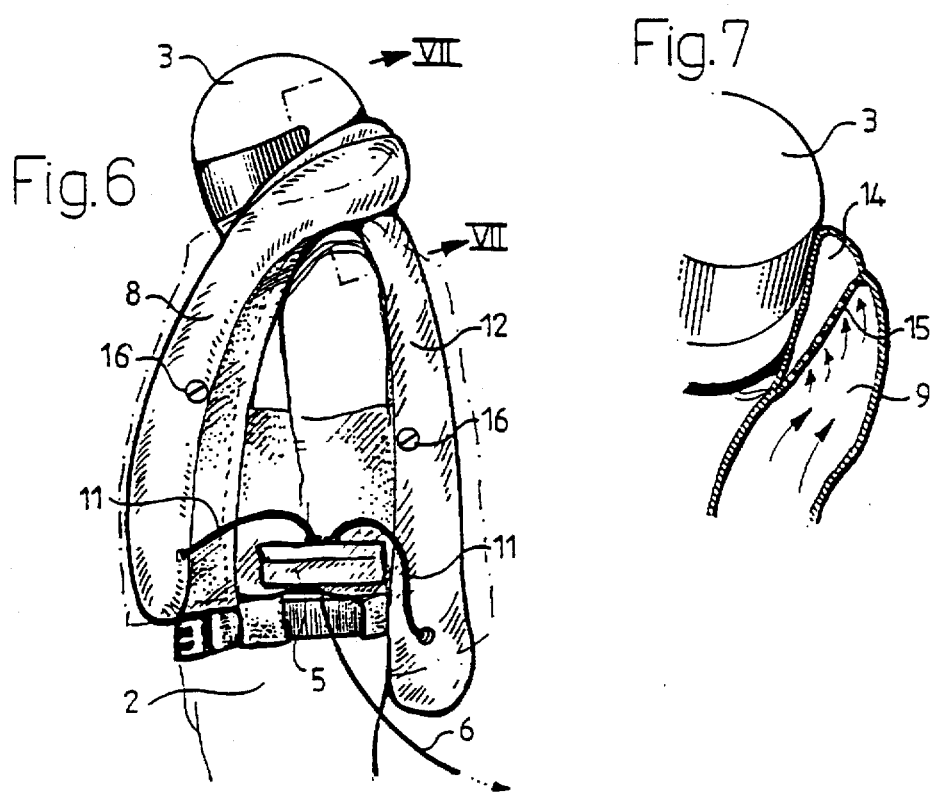

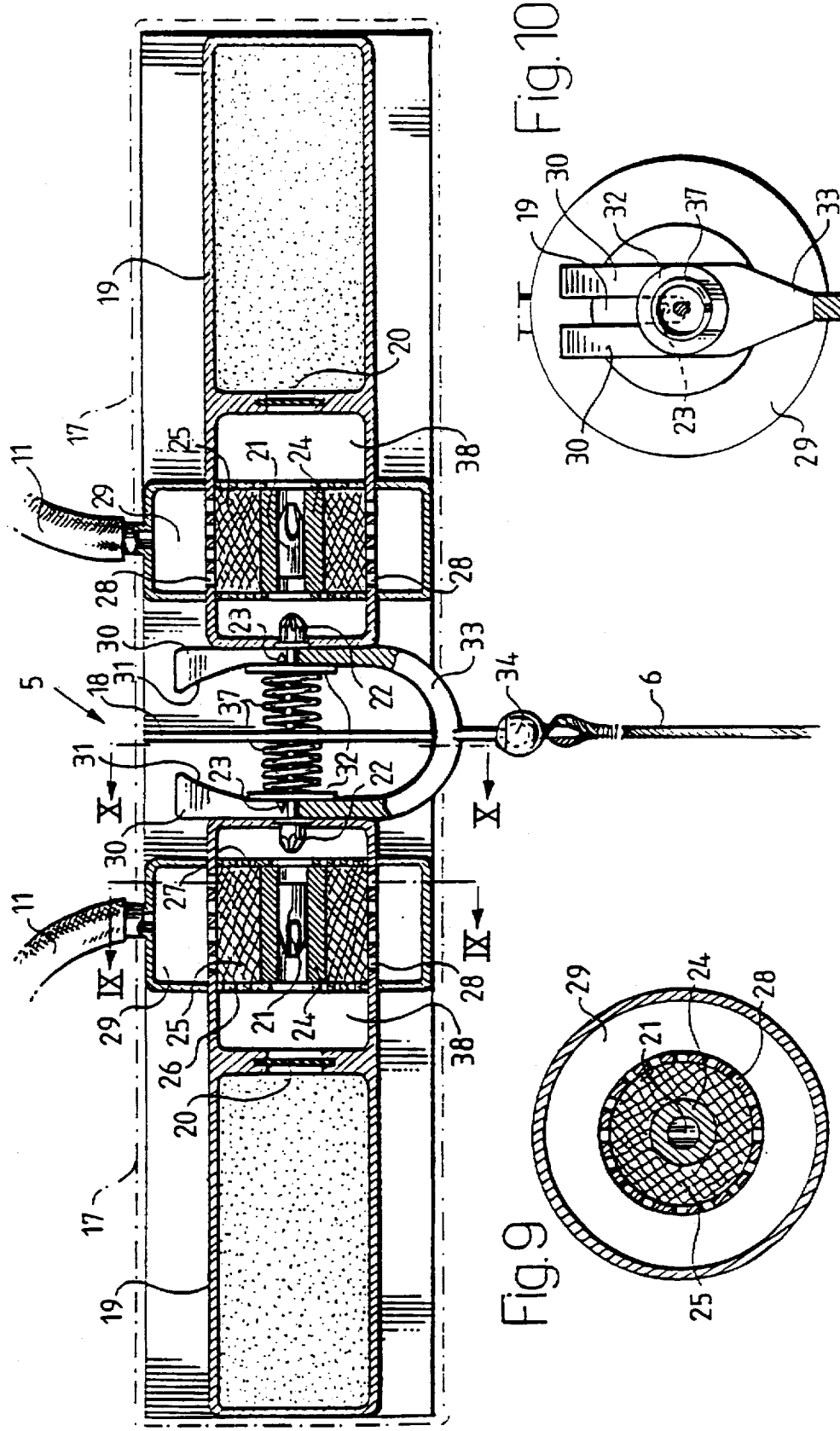

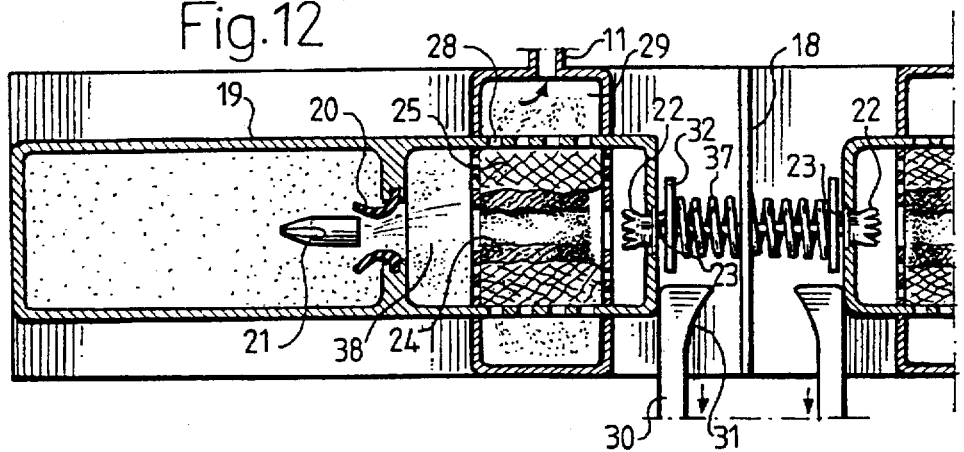
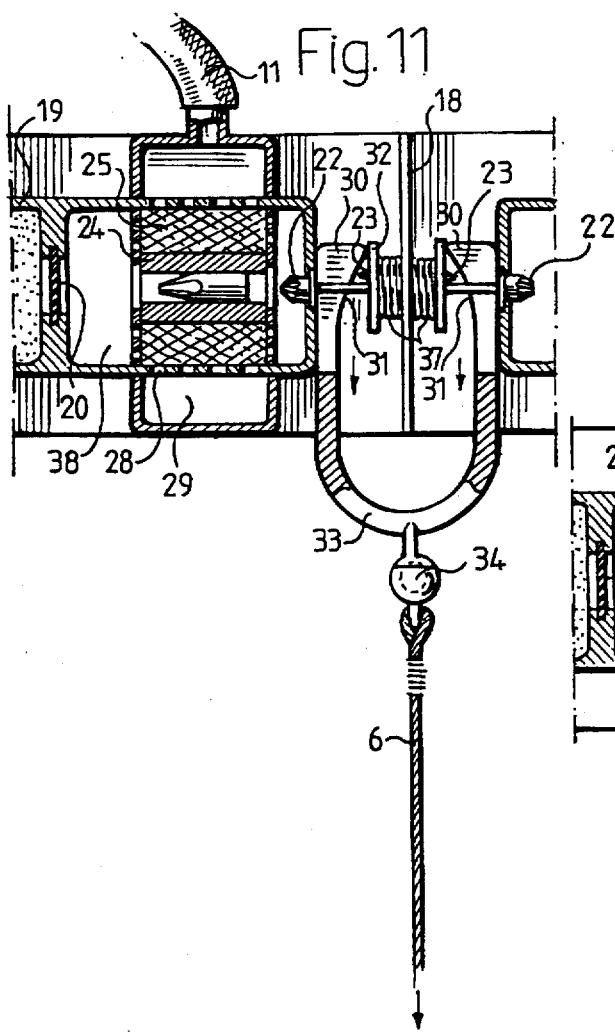
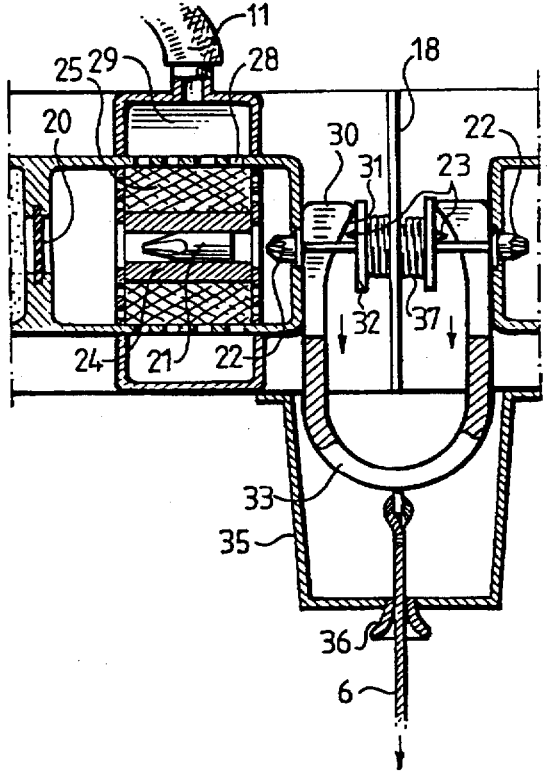

SAFETY APPAREL

BACKGROUND OF INVENTION

Safety apparel, particularly, but not exclusively, for motorcyclists, equestrians and other unprotected persons, comprising gas-inflatable, shock-absorbing pockets or pads, at least one gas-delivering device which is connected to said pockets or pads and which includes a container sealed by a sealing plate and containing compressed or liquified gas, a small explosive charge, means for initiating detonation of the explosive charge in the event of an accident which causes the wearer of the protective apparel to be thrown from a motorcycle, a horse or the like, and means activated by the explosive charge to penetrate the sealing plate.

There is a great need to provide improved protection for vital parts of the body, such as the neck, the spine and kidneys of persons who participate in activities that are associated with the risk of falling, such as motorcycling or riding on other, unprotected vehicles, riding on animals, and other activities in which there is a risk of falling from heights.

In addition to helmets and other types of protective clothing, such as leather clothes for motorcyclists, it has earlier been proposed to protect motorcyclists with the aid of suits or jackets that include inflatable, shock-absorbing pads. One problem in this regard, however, resides in the provision of a system with which the protective pads can be inflated with sufficient speed and with sufficient efficiency with the aid of simple equipment, and so as to minimize the risk of a malfunction and which will not injure the wearer or make any injury that the wearer might sustain more serious, and which will not noticeably affect the aesthetic appearance of the apparel as such.

Safety apparel of this nature is known, for instance, from U.S. Pat. No. 4,984,821, U.S. Pat. No. 4,825,469, U.S. Pat. No. 5,273,312 and WO 82/01464. The safety apparel taught by these Applications utilizes one or the other of the following two principles.

According to the first principle, see U.S. Pat. No. 4,984,821 and U.S. Pat. No. 4,825,469, the apparel is inflated with the aid of compressed or liquified gas from a container carried by the rider of the motorcycle or mounted on the motorcycle itself. It is difficult, however, to achieve sufficiently rapid inflation with gas from a container, among other things because of the time taken for the gas to expand. In either case, there is required a container which is highly pressurized, meaning that the container and the container sealing means, which is punctured by a ball or piston for instance, must be made relatively thick. The container will therefore be relatively heavy and a powerful explosive charge is required to achieve the acceleration and velocity necessary for the ball or piston to puncture the seal. An explosion of this nature taking place close to the body places the person concerned at serious risk.

In the case of U.S. Pat. No. 4,984,821, the explosive charge is detonated electrically and there is thus required access to a battery. Equipment of this kind is not suitable for use by equestrians. The safety apparel taught by U.S. Pat. No. 4,825,469 utilizes equipment which is fitted to a motorcycle and which is connected to the rider of the motorcycle by a hose. Among other things, this means that the rider of the bicycle must always connect the hose to the auxiliary motorcycle equipment, which constitutes an additional feature in his/her preparations, which may easily be forgotten. This solution is not suitable for use with equestrians, for instance.

According to the second principle, see WO 82/01464 and U.S. Pat. No. 5,273,312, there is used a detonator and a pyrotechnical, gas-generating material, essentially similar to that normally used for vehicle air bags. In order for gas generation of this nature to be sufficiently effective in the present context, it must be associated with a very powerful detonation, which can be both unpleasant and hazardous to the driver or rider, since the detonation takes place close to the body of the person concerned.

The gases generated also have a very high temperature, which needs to be lowered so as not to cause burn injuries. Lowering of the temperature may be difficult to achieve without seriously delaying the rate at which the pads are inflated. WO 82/01464 describes an arrangement of this kind which comprises two gas-generating units which are activated at different times so as to maintain gas generation over a given period of time. Both units are provided with cooling devices for cooling the hot gases of combustion.

U.S. Pat. No. 5,273,312 discloses a similar device using electrical detonation which requires a battery. Further, the device comprises several explosive and pyrotechnical charges which renders the device more complicated and increases the risk of malfunction.

SUMMARY OF INVENTION

The main object of the present invention is to provide safety apparel which includes inflatable, shock-absorbing pockets or pads which are inflated with the aid of highly reliable equipment which will effect complete inflation in a very short period of time and with which the aforesaid drawbacks associated with known equipment are eliminated or essentially reduced, among other things.

Accordingly, an inventive safety apparel of the kind defined in the first paragraph of this document is mainly characterized in that the explosive charge is intended to be detonated by means of a striking pin operated by a spring, and in that means are arranged for storing the energy required herefor in the spring as a result of a relative motion between the wearer of the protective apparel and a motorcycle, a horse or the like caused by an accident.

In this way a fail-safe operation is obtained which does not need a battery. As the spring is not tensioned until an accident occurs the risk of unintended release of the energy in a pretensioned spring is eliminated.

Preferably said means comprises a release line connected between the safety apparel and a motorcycle, a horse or the like which coacts with a means which when pulling on the line stores energy in the spring which energy thereafter is immediately released so that the striking pin will strike the explosive charge with a powerful force.

There are preferably used two gas-releasing devices which are so mounted that the recoil forces taken up by the drive springs will balance out each other.

It is preferred that the gas-delivering device includes pyrotechnical material which is disposed between the explosive charge and said sealing plate and which is intended to be ignited upon detonation of the explosive charge; and in that the hot gases generated by said material are mixed with and heat the gases flowing from the container so as to expand the gases and therewith accelerate inflation of the shock-absorbing pockets or pads.

The gases are preferably mixed in a chamber which is located adjacent the sealing plate and which chamber accommodates the pyrotechnical material.

The inventive safety apparel will preferably have the form of a vest or jacket provided with a collar, wherein a first gas-releasing device is connected to a pad which can be inflated to provide a protective collar and a second gas-releasing device is connected to an inflatable pad which protects the spine and the kidneys of the wearer among other things. The first gas-releasing device may optionally also be connected to an elongated pad on each side of the opening at the front of the vest or jacket.

In their passive states, the inflatable pads will suitably have the form of folded bags enclosed in pockets formed in the vest and fastened with the aid of Velcro® fasteners or like self-fastening means and open automatically as the pads are inflated.

In order to prevent excessive inflation of the pads, which would cause the pads to lose their resiliency, each pad is suitably provided with at least one pressure safety valve which has been set to an appropriate value. The valve will therewith be opened instantaneously also when the pad is subjected to a compressive force, therewith providing softer shock-absorption.

Other features of the invention will be apparent from the appended claims.

The invention will now be described in more detail with reference to an exemplifying embodiment thereof and also with reference to the accompanying drawings.

BRIEF DESCRIPTION OF DRAWINGS

FIG. 1 illustrates a motorcyclist wearing an inventive protective vest.

FIG. 6 is a side view of the vest after inflation.

FIG. 7 is a partial sectioned view of one part of the vest during inflation.

FIG. 8 is a longitudinal section view of two combined gas-releasing devices according to the invention.

FIG. 9 is a cross-sectional view taken on the line IX—IX in FIG. 8.

FIG. 10 is a cross-sectional view taken on the line X—X in FIG. 8.

FIGS. 11 and 12 illustrate part of the arrangement shown in FIG. 8 at two stages after detonation.

FIG. 13 illustrates a somewhat modified embodiment of the arrangement in the position illustrated in FIG. 11.

DETAILED DESCRIPTION OF INVENTION

Figure 2:
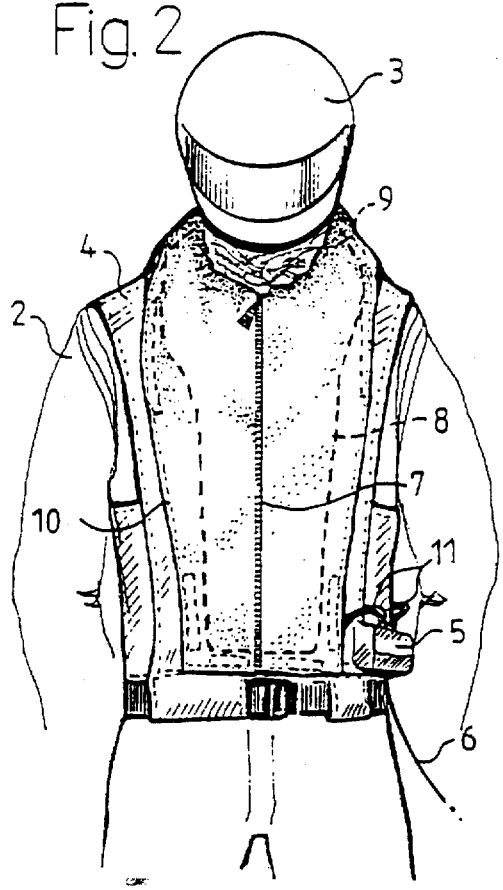
FIGS. 2 and 3 are respective front views which show the vest prior to inflation and after inflation.

FIG. 1 illustrates a motorcycle 1 and a motorcyclist 2 who, in addition to a helmet 3, also wears a protective vest 4 which includes a plurality of pockets or pads which are inflated with gas to form protective and shock-absorbing pads in the event of an accident in which, for instance, the motorcyclist is thrown from the motorcycle. The pockets or pads are inflated by means of at least one gas-releasing device 5 which is carried by the motorcyclist and connected to the motorcycle 1 by means of a release line or activating line 6. When the tension in the line exceeds a predetermined value, for instance caused by the motorcyclist being thrown from the motorcycle, the line triggers the release of gas from the unit 5, causing the pads in the vest 4 to be quickly inflated with gas.

FIG. 2 is a front view of the vest 4 in a passive state. The vest may have the form of a conventional vest provided with a dividing zip fastener 7. On each side of the zip fastener there is located part of a protective chest pad 8, these parts being connected to one another via a pad 9 provided in the collar. In the passive state of the vest shown in FIG. 2, the pads 8 and 9 have the form of folded bags which are concealed in pockets formed in the vest material, these pockets being fastened with the aid of self-fastening fasteners 10 referred to as Velcro® type fasteners.

The pads 8 and 9 can be inflated by delivering gas through a conduit means 11 leading from the gas-releasing device 5. As described above, inflation of the pads is initiated by a pull on the line 6. As gas is delivered to the pads, the pads will quickly inflate (see FIG. 3) and the Velcro® type fasteners will open automatically so as to enable the pads to develop and be filled to their full volume.

Figure 4:
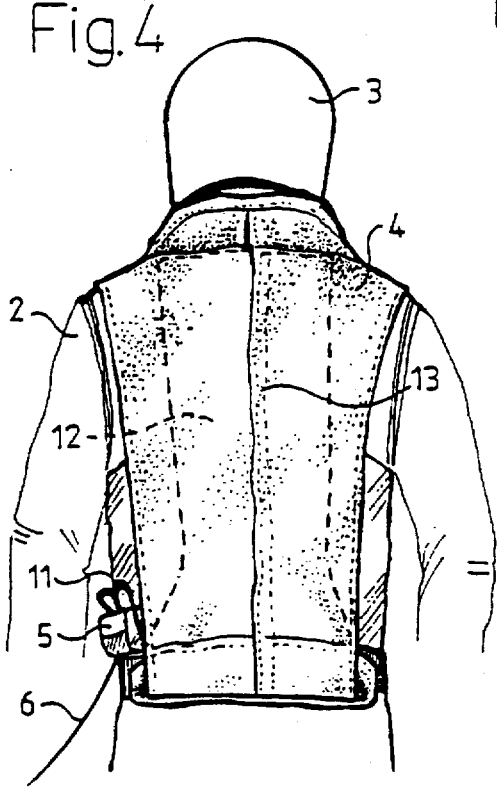
FIGS. 4 and 5 are rear views of the vest prior to and after inflation respectively.

FIG. 4 is a rear view of the vest 4, from which it will be seen that the vest is provided with a pad 12 which extends along the spine of the wearer and which has a bottom part which is designed to effectively protect the kidneys. In its passive state, the pad 12 is folded and enclosed in the vest with the aid of a Velcro® type fastener 13.

Figure 3:
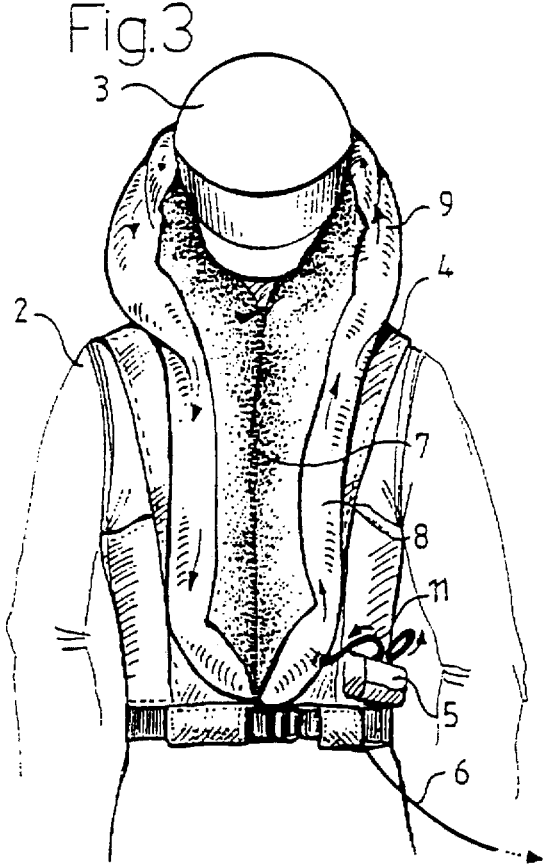
Figure 5:
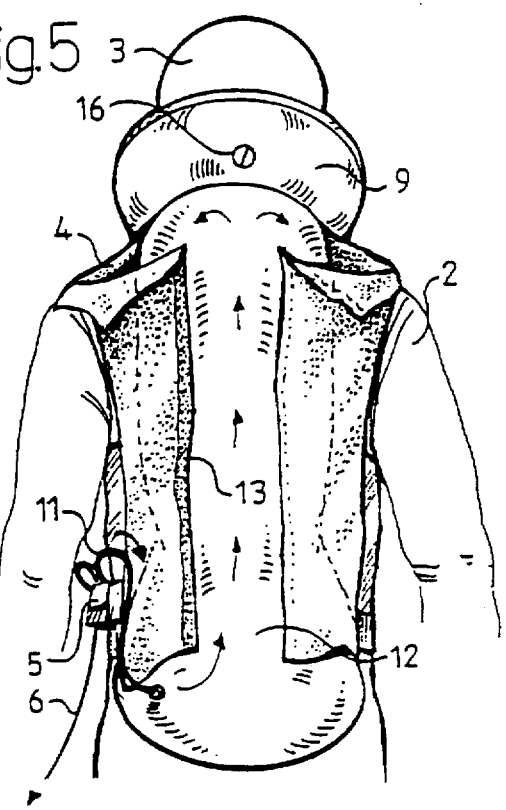

FIG. 5 is a view corresponding to FIG. 3 and shows the vest 4 subsequent to initiation of the device 5, which as therewith delivered gas to the back pad 12, through a second conduit means 11. The pad is therewith quickly inflated and opens the fastener 13, so as to form effective protection for the spine and the kidneys, among other parts. It will be seen from FIG. 5 that the collar pad or cushion 9 seats tightly around the neck and the lower part of the head and provides highly effective protection, since it holds the head temporarily in a correct position.

The fact that, when inflated, the pads are highly effective in protecting the wearer will also be apparent from the side view shown in FIG. 6.

FIG. 7 is a sectional view taken on the line VII—VII in FIG. 6. As will be seen, the collar pad 9 of this embodiment is supplemented with an inwardly-lying pad 14, which is inflated simultaneously with the pad 9 but at a slightly slower rate. This prevents the pad 9 from gripping beneath the wearer's helmet 3 and lifting the helmet as the pad inflates. In the case of the illustrated embodiment, this slower inflation of the inwardly-lying pad 14, which lies nearest the helmet 3, is achieved by virtue of the pad 14 communicating with the pad 9 through an adapted number of openings 15 of suitable area. The pad 14 will therewith exert a soft, inwardly directed abutment force around the neck and the helmet, while holding the pad 9 spaced from the helmet at the same time.

In order to prevent the pads being inflated to an excessively high pressure, which would make the pads very hard and less shock-absorbing, the pads or the conduit means leading thereto are provided with strategically positioned pressure safety valves 16, see FIGS. 5 and 6. These are set to an appropriate value, for instance about 20 bars, to provide an optimal shock-absorbing effect and also to permit gas to leave the pads in order to achieve the desired shock-absorbtion. Gas can be permitted to leak from the pads through seams or the like within the space of some seconds after an accident. However, it may be beneficial to design the collar pad 9 so that it will fixate the head more securely and so that the head fixating effect of the pad will remain until it can be established whether or not the neck vertebrae have been damaged as the result of an accident. The pad could then be used as a means for fixating the head until the person concerned is under medical care.

The aforedescribed vest can be given an attractive appearance, so that it will scarcely distinguish from conventional vests. The folded, passive protective pads are not visible and are fully protected in the vest pockets intended herefor.

One important function of the vest is to retain the inflated pads in their precise, correct positions on the body so as to provide an optimal protective effect.

FIG. 8 illustrates a combined gas-delivery arrangement 5 which is comprised of two identical devices 17. The devices 17 face towards one another and are mounted on a common holder plate 18. Each device 17 includes a gas container 19 which contains a compressed, inert gas, for instance argon. The container pressure may be in the order of 120–140 bars. The container 19 is sealed by means of a rupturable sealing plate 20. The plate may be pierced or punctured by a ball-shaped projectile 21, conveniently a plastic ball, which when the device is initiated is accelerated with the aid of an explosive charge enclosed in a capsule 22. The explosive charge is detonated with the aid of a striking pin 23 which is driven by a spring 37, as explained in more detail herebelow. The illustrated capsule or cartridge 22 is of the kind which includes an additional charge around the rim of its base surface, wherein the striker 23 is intended to strike the rim of the capsule. The capsule and explosive charge contained therein are suitably of the kind accepted by the authorities, for instance the kind used in so-called nailing guns and like apparatus.

According to the present invention, there is provided between the gas container 19 and the explosive charge in the capsule 22 a chamber 38 which accommodates pyrotechnical material, said material being in a cylindrical form 24 in the illustrated embodiment. The cylinder 24 may also be used to hold the ball 21 in position centrally opposite the sealing plate 20 and coaxial with the explosive charge in the capsule 22. In turn, the cylinder 24 is held in place with the aid of a net-like body 25 located in the chamber 38 between two perforated partition walls 26 and 27 respectively.

The chamber formed around the cylinder 24 and filled by the net-like body 25 communicates with an outwardly-lying collecting chamber 29 through a plurality of holes 28 disposed around the chamber periphery. The number and the diameter of the holes are determined depending on the required passage of gas. In turn, the collecting chamber is connected to the protective pads through an associated hose 11. Because the holes 28 are distributed uniformly around the periphery, no net reaction forces are obtained on the device in its radial direction as the gas flows out. FIG. 9 is a sectional view of the device taken on the line IX—IX in FIG. 9.

The spring 37 coacting with respective strikers 23 is tensioned by means of a slotted arm 30 which includes a camming surface 31 for coaction with a striker mounting plate 32. In the case of the illustrated embodiment, the two arms 30 of respective devices have the form of a common U-shaped structure 33 which is connected to the release line 6 by means of a ball joint 34. The section view of FIG. 10, taken on the line X—X in FIG. 8, shows the arm 30 and its slot 32 in side view.

As will be seen from FIG. 11, when the release line 6 is pulled, for instance as a result of the rider of the motorcycle being thrown in the event of an accident, the camming surfaces 31 of the two arms 30 will compress the springs 37 simultaneously to a predetermined extent. As the pull on the line 6 continues, the arms 30 will release the springs 37 simultaneously, wherewith the energy stored in respective springs will drive the mounting plates 32 with the strikers 23 towards an associated capsule 22. The strikers will therewith strike the capsule with great force and detonate the explosive charge contained therein. The springs are thus tensioned and released positively in one and the same movement and only when an accident has occured. In this way the risk of unintended release of striking energy due to a technical fault is eliminated.

As illustrated in FIG. 12, the gas streaming from the capsule 22 accelerates the ball 21 which therewith penetrates and ruptures the sealing plate 20. The pyrotechnical material contained in the cylinder 24 is ignited as the explosive charge is detonated, and will burn rapidly while generating gas. The skilled person will be able to choose an appropriate material from those materials available commercially. Combustion is made more effective by the cylindrical shape of the material, whereby the material will burn inwardly and outwards and outwardly and inwards. The hot combustion gases thus generated heat the material of the surrounding net-like body 25.

When the gas leaving the container 19 enters into and swirls around the chamber surrounding the cylinder 24, the gas will be heated as a result of its contact with the net-like body 25, and as a result of direct contact with the hot combustion gases generated by the material contained by the cylinder 24. The gas deriving from the container 19 will therewith be heated rapidly and will expand at the same time as the hot combustion gases are cooled. The gases mixed in the chamber then leave through the openings 28 and enter the surrounding collecting chamber 29 and are passed from there through the conduit means 11 and to the pad or pads connected to the chamber.

The net-like body 25 also functions as an effective silencer, in addition to heating the gases from the container 19 and holding the pyrotechnical material 24 in place. The outwardly-lying collecting chamber 29 may also be provided with a corresponding, sound-attenuating net-like body.

When applying the invention, the gas leaving the container 19 will expand effectively and very quickly, as a result of being heated by the combustion gases generated by the pyrotechnical material 24. The rapid inflation of the protective pads is also assisted by the volume of these combustion gases, which are cooled automatically by the gas emanating from the container 19. Thus, the combined release of gas from the container 19 and the generation of gas by the combustion of the pyrotechnical material 24 results in extremely fast inflation of the protective pads without using powerful detonations or excessively hot gases. It was established experimentally that protective pads having a volume of 17–18 liters could be inflated in less than 0.017 seconds.

As a result of the illustrated combination of two mutually facing gas-generating devices 17, the axial recoil forces generated when detonating the explosive charges are taken up and balanced by the springs 24. Axial forces acting in opposite directions will also be balanced with one another via the plate 18.

FIG. 13 illustrates a slightly modified embodiment in which the U-shaped member 33 is surrounded by a box-like structure 35 provided with an opening 36 which forms a guide for the release line 6, such that forces exerted by the line will always pull the U-shaped member 33 in one and the same direction, irrespective of the direction of the line. This provides a fail-safe function. The box may be constructed to open when the U-shaped member 33 strikes the bottom of the box, so as to release the motorcyclist from the motorcycle.

The line 6 may be attached to the motorcycle via a line-part which has been rolled-up into a spring-like configuration, so as to permit the motorcyclist to move to some extent without triggering the gas-generating devices. This can also be achieved with constructions similar to those used with roller-type safety belts or seat harnesses, for instance.

The arrangement may also include a shear pin or like device which requires a predetermined smallest tension in the line 6 in order for the devices to be triggered. This may be achieved in the embodiment illustrated in FIG. 13 by means of a safety ring or the like attached to the line at a position adjacent the outlet hole 36, on the inside of the box 35.

Although the invention has been described with reference to a preferred exemplifying embodiment thereof, it will be understood that modifications can be made in several respects within the scope of the following claims. For instance, the vest may be varied as desired and may be provided with any desired number of protective pads positioned as required. The gas-generating arrangement may also be placed in another position, if found suitable. It will be understood that the safety apparel is not limited to a vest, but may have the form of a jacket or a complete suit. Alternatively, the safety apparel may comprise a separate pair of trousers provided with protective pads and used together with a jacket or vest. The different components of the described construction may also be varied in several respects while retaining the intended function. For instance, the ball 17 can be replaced with a piston-like device if so desired. The striker actuating mechanism can also be modified, and the pressure spring may be replaced with a pull spring, for instance. The pyrotechnical material in the cylinder 24 may be chosen by the man skilled in the art so as to obtain a suitable burning time, depending on the application concerned.

I claim:

1. Safety apparel, particularly, but not exclusively, for motorcyclists, equestrians and other unprotected persons, comprising gas-inflatable, shock-absorbing pockets or pads (8, 9, 12), at least one gas-delivering device (5) which is connected to said pockets or pads and which includes a container (19) sealed by a sealing plate (20) and containing compressed or liquified gas, a small explosive charge (22), means (6, 30) for initiating detonation of the explosive charge in the event of an accident which causes the wearer (2) of the protective apparel (4) to be thrown from a motorcycle (1), or a horse, and means (21) activated by the explosive charge (22) to penetrate the sealing plate (20), characterized in that the explosive charge (22) is intended to be detonated by means of a striking pin (23) operated by a spring (37), and in that said means (6, 30) are arranged for storing the energy required herefor in the spring as a result of a relative motion between the wearer (2) of the protective apparel (4) and a motorcycle (1), or a horse caused by an accident.

2. Safety apparel according to claim 1, characterized in that said means (6, 30) comprises a release line (6) connected between the safety apparel (4) and a motorcycle (1), or a horse which coacts with a means (30) which when pulling on the line stores energy in the spring (37) which energy thereafter is immediately released so that the striking pin (23) will strike the explosive charge (22) with a powerful force.

3. Safety apparel according to claim 2, characterized in that the release line (6) when pulling on the line is arranged first to compress the spring (37) to a predetermined maximal extent and then to release instantaneously the spring to bring the striking pin (23) to strike the explosive charge (22).

4. Safety apparel according to claim 2, characterized in that driving spring (37) and the striking pin (23) are carried by a holder (18) connected to the gas-delivering device.

5. Safety apparel according to claim 4, characterized in that said apparel includes two gas-delivering devices (17); and in that said two devices are positioned so that their respective ends provided with the holder (18) for the driving spring (37) and the striking pin (23) face one another.

6. Safety apparel according to claim 5, characterized in that the holders (18) of said two devices (17) are connected mechanically, such that the recoil forces generated by detonation of the explosive charges (22) and taken up by the driving springs (37) will balance-out one another.

7. Safety apparel according to claim 5, characterized in that a means (31) for compressing and releasing the two driving springs (37) are attached commonly to the release line (6) for simultaneous detonation of the two explosive charges (22).

8. Safety apparel according to claim 1, characterized in that the gas-delivering device (5) includes pyrotechnical material (24) which is disposed between the explosive charge (22) and said sealing plate (20) and which is intended to be ignited upon detonation of the explosive charge; and in that the hot gases generated by said material are mixed with and heat the gases flowing from the container (19) so as to expand the gases and therewith accelerate inflation of the shock-absorbing pockets or pads (8, 9, 12).

9. Safety apparel according to claim 8, characterized by a chamber (38) which is located adjacent the sealing plate (20) and in which mixing of said gases is effected, and in that said chamber accommodates the pyrotechnical material (24).

10. Safety apparel according to claim 9, characterized in that the pyrotechnical material has a cylindrical shape (24) and is mounted in the mixing chamber (38), and in that said means for penetrating the sealing plate includes a protectile (21) disposed in the cylindrical material.

11. Safety apparel according to claim 8, characterized in that the pyrotechnical material (24) is surrounded by a net-like body (25) which is heated by the hot gases and which in turn heats the expanding gas from the gas container (19).

12. Safety apparel according to claim 9, characterized in that the chamber (38) includes around its periphery a plurality of outlet openings (28) which open into an outer collecting chamber (29) which is connected with said pockets or pads (8, 9, 12) through a hose (11).

13. Safety apparel according to claim 5, wherein the apparel has the form of a vest or jacket provided with a collar, characterized in that one gas-delivering device (17) is connected to said pad (9) which can be inflated to provide a protective collar; and in that the other gas-delivering device (17) is connected to said inflatable pad (12) which protects the spine and kidneys.

14. Safety apparel according to claim 13, characterized in that the pad (9) which can be inflated to provide a protective collar also connects with said pad (8) on each side of the opening (7) on the front side of the vest or jacket, these pads (8) being inflated simultaneously with the collar pad.

15. Safety apparel according to claim 13, characterized in that when in a passive state, the inflatable pads (8, 9, 12) have the form of folded bags enclosed in pockets formed in the material of the vest (4), wherein the pockets are closed with the aid of Velcro® type fastener means (10, 13) which are unfastened automatically as the pads inflate.

16. Safety apparel according to claim 1, characterized in that the apparel includes at least one pressure valve (16) which is connected to the protective pads (8, 9, 12) and which maximizes the pressure to which the pads can be inflated.

* * * * *